3,382,279
PROCESS FOR THE PRODUCTION OF SILICON-CONTAINING N:N':N" - TRIORGANO - B:B':B"-TRIHYDRIDO-BORAZOLES
Elmar-Manfred Horn, Aachen, and Hans Niederprum, Monnheim, Germany, assignors to Farbenfabriken Bayer Aktiengesellschaft, Leverkusen, Germany, a corporation of Germany
No Drawing. Continuation of application Ser. No. 412,239, Nov. 18, 1964. This application Feb. 8, 1967, Ser. No. 614,754
Claims priority, application Germany, Nov. 29, 1963, F 41,423
1 Claim. (Cl. 260—551)

ABSTRACT OF THE DISCLOSURE

A series of novel silicon-containing B,B',B"-trihydrido-N,N',N"-triorgano-borazoles is disclosed along with a method of preparing the same. The novel compounds have the formula

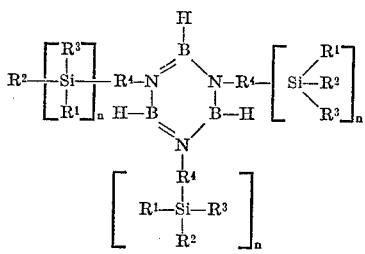

wherein $R^4$ is a straight chain alkylene radical having 3 to 7 carbon atoms, a 4-benzylene radical, a 3-thia-heptylene radical or a 3-oxahexylene radical, $R^1$ and $R^2$ and $R^3$ are each alkyl having 1 to 2 carbon atoms, alkoxy having 1 to 2 carbon atoms, phenyl, methylphenyl and hydrogen if $n$ is 1 and wherein $R^4$ is a branched trifunctional alkylene chain, $R^1$ and $R^2$ are each hydrogen or methyl and $R^3$ is substituted by an oxygen linkage between the two Si atoms, if $n$ is 2. The compounds are produced by reacting an alkali metal borohydride, alkylene earth metal borohydride, boron trihalide, or a boron trihalide ether addition compound with a mononitrile at a temperature of from 0–100° C.

The compounds produced in accordance with the invention can be polymerized to form heat stable polymeric materials.

---

This application is a streamlined continuation of application Ser. No. 412,239 filed Nov. 18, 1964, now abandoned.

The subject of the present invention is a process for the preparation of silicon-containing B:B':B" - trihydrido-N:N':N"-triorganoboroazoles by reacting mononitriles with borohydrides and boron halides, wherein mononitriles which are bonded to a silyl- or siloxanyl group through at least one carbon atom are reacted with borohydrides and, if desired, boron halides or addition compounds of boron halides at temperatures above 0° C., preferably between +40 and +100° C.

As silyl derivatives of mononitriles it is possible to use silanes of the general formula $$R^1R^2R^3Si—R^4—C\equiv N$$

in which $R^1$, $R^2$ and $R^3$ denote alkyl, phenyl, alkoxy or halogen radicals which may be the same or different and which may be mono- or poly-substituted with alkyl or phenyl groups and $R^4$ denotes a linear or branched alkylene group, an alkyl-silyl- halogen alkyl-silyl- or silyl-alkyl-substituted alkylene group, a phenylene group, an alkyl-substituted phenylene group or an ether or thioether radical.

The term alkyl and alkoxy for $R^1$, $R^2$ and $R^3$ as referred to above means preferably lower alkyl with 1 to 6 carbon atoms and most preferably with 1 to 2 carbon atoms; the term alkylene for $R^4$ as referred to above means preferably alkylene groups with 2 to 6 carbon atoms and the term halogen as referred to above means preferably chlorine.

As siloxanyl derivatives of mononitriles there may be used cyclic or open-chained organo di- or polysiloxanes which contain a nitrile group bound through at least one carbon atom.

In the case where trimethyl-(2-cyanoethyl)-silane, sodium borohydride and boron trifluoride-tetrahydrofuran are used as starting compounds, the process according to the invention may be described by the Equation 3:

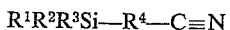

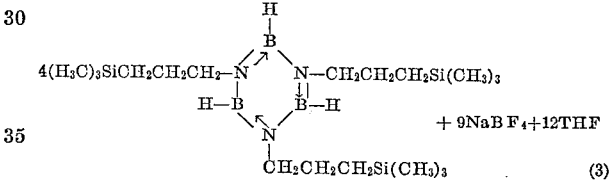

(THF=tetrahydrofuran). In the reaction, no hydrogen is liberated since all the hydridic hydrogen present in the borohydride is used up quantitatively for hydrogenating the nitriles put into the reaction and for forming the B:B':B"-trihydroborazoles.

Siloxane derivatives which contain a nitrile group bound to a silicon atom through at least one carbon atom can be reacted by a reaction analogous to Equation 3. Splitting of the $\equiv Si—O—Si\equiv$ bond does not occur in this reaction.

This result was not to be expected since it is known (Zeitschrift für Naturforschung 8b (1953), p. 608; J. Am. Chem. Soc. 80 (1958), p. 1130 and 81 (1959), p. 5551) that the siloxane bond is split by boron halides even at low temperatures (J. Chem. Soc. (London) 1958, pp. 604–609; Can. J. Chem. 39 (1961), pp. 808–814).

As end product of this splitting reaction which proceeds, for example, in accordance with Equation 4

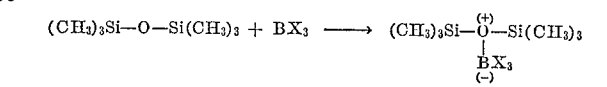

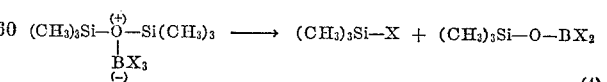

(4)

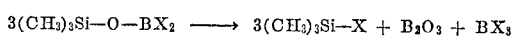

there occurs, in addition to silicon halide and boron oxide, also boron halide which causes renewed release of a siloxane bond. This means that one mol. of boron halide destroys 1.5 siloxane bonds.

In contrast to this, the process according to the invention can be described by means of the example of the reaction of 4-cyano-2:2:6:6-tetramethyl-2:6-disilate-tetrahydropyran with, for example, sodium borohydride and boron trifluoride-tetrahydrofuran according to the Equation 5:

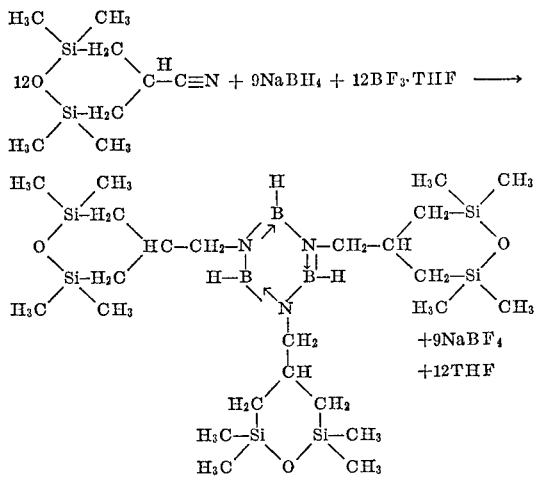

The siloxane bond is thus preserved during the reaction. Starting from silane- or siloxane derivatives which carry halogen atoms, especially chlorine atoms, on the silicon atom, it is possible to dispense with the addition of boron halides or their addition products. These halogen silane- or halogen siloxane derivatives which contain nitrile groups, for example dimethyl-(2-cyanoethyl)-chlorosilane or 1:1:3:3-tetramethyl-1-chloro-3-(β-cyanoethyl)-disiloxane can be converted directly with borohydrides into the corresponding B:B′:B″-trihydrido-borazoles, the halogen atom or atoms on the silicon being at the same time replaced by hydrogen atoms. These reactions may be represented, for example, by Equations 6 and 7:

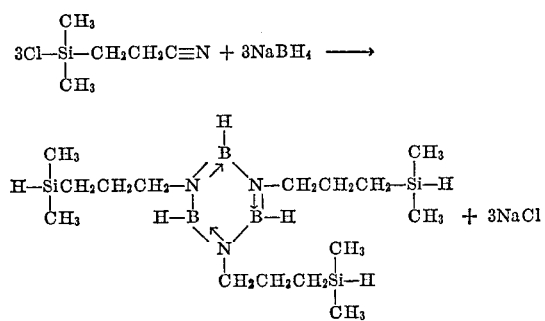

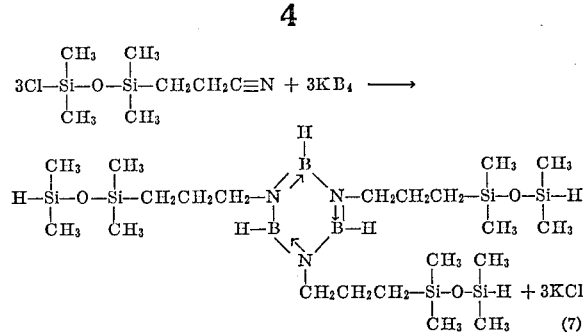

Also those silane- or siloxane derivatives which, for example like methyl - (2 - cyanoethyl) - dichlorosilane, $Cl_2(CH_3)SiCH_2CH_2C\equiv N$, contain more than one halogen atom (chlorine atom) directly bound to the silicon atom can be reacted according to the invention to form B:B′:B″-trihydroborazoles, for example according to Equation 8:

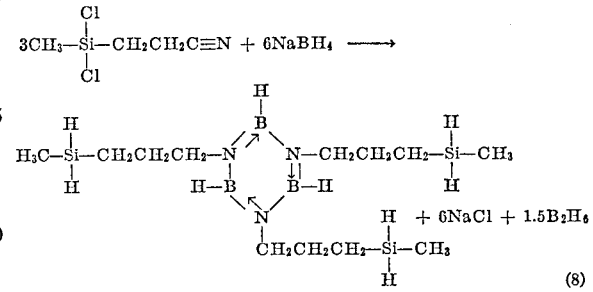

In these cases, diborane is thus formed as by-product. It has been found advantageous in these cases to bind the diborane liberated to an amine in known manner, preferably to a tertiary amine, and thus the process according to the invention can be coupled to the preparation of borazanes or their derivatives, for example in accordance with Equation 9:

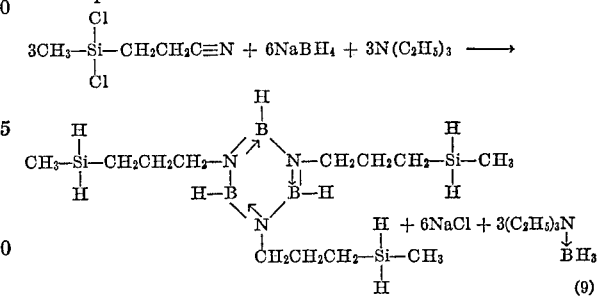

Borazanes or their derivatives (borazenes and borazoles) are valuable starting compounds for the preparation of, for example, boron containing, heat stable polymers.

The following are mentioned as examples of silane- or siloxane derivatives which can be used in the process according to the invention:

(a) SILANE DERIVATIVES

| | |
|---|---|
| Trimethyl-(2-cyanoethyl)-silane | $(CH_3)_3SiCH_2CH_2C\equiv N$ |
| Dimethyl-phenyl-(2-cyanoethyl)-silane | $C_6H_5(CH_3)_2SiCH_2CH_2C\equiv N$ |
| Dimethyl-(4-methyl-phenyl)-(2-cyano-ethyl)-silane | $(p-CH_3-C_6H_4)(CH_3)_2SiCH_2CH_2C\equiv N$ |
| Trimethyl-(4-cyano-phenyl)-silane | $(CH_3)_3SiC_6H_4-C\equiv N$ |
| 1:3-bis-(trimethylsilyl)-2-cyano-propane | $(CH_3)_3SiCH_2CH(CN)CH_2Si(CH_3)_3$ |
| 1,5-bis-(trimethylsilyl)-3-cyano-pentane | $(CH_3)_3Si(CH_2)_2CH(CN)(CH_2)_2Si(CH_3)_3$ |
| Methyl-diethoxy-(2-cyanoethyl)-silane | $CH_3(C_2H_5O)_2SiCH_2CH_2C\equiv N$ |
| Methyl-(2-cyanoethyl)-dichlorosilane | $Cl_2(CH_3)SiCH_2CH_2C\equiv N$ |
| (2-cyanoethyl)-trichlorosilane | $Cl_3SiCH_2CH_2C\equiv N$ |
| Dimethyl-(2-cyanoethyl)-monochlorosilane | $Cl-Si(CH_3)_2-(CH_2)_2-C\equiv N$ |
| (3-trimethylsilyl)-n-propyl-2′-cyano-ethyl-thioether | $(CH_3)_3Si-CH_2CH_2CH_2-S-CH_2CH_2C\equiv N$ |
| 2-trimethylsilyl-ethyl-2′-cyanoethyl-ether | $(CH_3)_3Si-CH_2CH_2-O-CH_2CH_2C\equiv N$ |
| 3-trimethylsilyl-n-propyl-2′-cyanoethyl ether | $(CH_3)_3Si-CH_2CH_2CH_2-O-CH_2CH_2C\equiv N$ |
| 2-(methyldiethoxysilyl)-ethyl-2′-cyanoethyl-ether | $(CH_3)(C_2H_5O)_2Si-CH_2CH_2-O-CH_2CH_2C\equiv N$ |
| 1:3-bis-(chlorodimethylsilyl)-2-cyanopropane | $ClSi(CH_3)_2-CH_2-CH-CH_2-Si(CH_3)_2Cl$ <br> $\qquad\qquad\qquad\qquad\; C\equiv N$ |

(b) SILOXANE DERIVATIVES

| | |
|---|---|
| 1:1:1:3:3-pentamethyl-3-(β-cyanoethyl)disiloxane | $(CH_3)_3Si-O-Si(CH_3)_2CH_2CH_2C\equiv N$ |
| 4-cyano-2:2:6:6-tetramethyl-2:6-disila-tetrahydropyrane | ![structure] |

The boron halides that can be used in the process according to the invention have the general composition $BX_3$, where X stands for F, Cl, Br or I. Because they are more easily dosable, it is preferred to use the well known addition compounds of boron halides, especially compounds obtained by the addition of boron halides to ethers, e.g. boron trifluoride diethyl ether or boron trifluoride tetrahydrofuran. For reasons of economy, it is preferred to use boron trifluoride and its addition compounds.

Again from economic considerations it is preferred to use alkali borohydrides, especially the well available sodium borohydrides, although other alkali- or alkaline earth borohydrides can also be used for the reaction.

The use of solvents or dispersing agents, e.g. ethers such as tetrahydrofuran or hydrocarbons is advantageous although other inert solvents or dispersing agents may also be used.

As amines that are suitable for combining with diborane there are used especially tertiary amines such as trimethyl-, triethyl-, tripropyl-, tributylamine, dimethylaniline, diethylaniline, dimethylcyclohexylamine or pyridine although other primary and secondary amines such, for example, as dimethylamine, methyl aniline, piperidine, methylamine, ethylamine, aniline, toluidine or cyclohexylamine may also be used.

The process of the invention is carried out at temperatures above 0° C., preferably between +40 and +100° C. With the lower reaction temperatures, it is possible to carry out the process without pressure although pressure may be employed, e.g. a nitrogen pressure.

The new, hitherto not described, silicon-containing B:B′:B″-trihydridoborazoles prepared by the process according to the invention are of importance as additives for silicone rubber in improving its storage stability, thermostability and mechanical properties and they can also be used as starting materials in the preparation of thermostable high polymers which have neutron absorbing properties and are used as lubricants and lubricant additives.

EXAMPLE 1

Preparation of B:B′:B″ - trihydrido - N:N′:N″ - tris-[2:2:6:6 - tetramethyl - 2:6-disila-tetrahydropyranyl-(4)-methyl]-borazole.

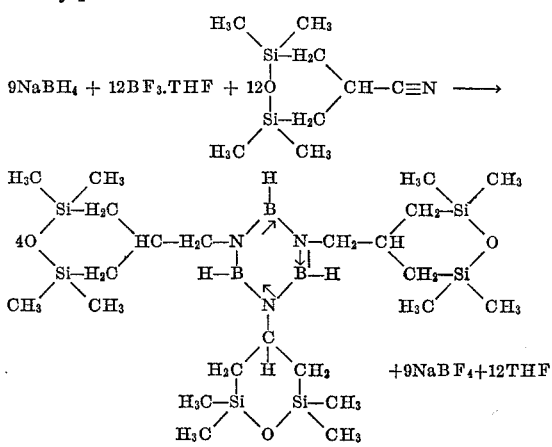

In a round-bottomed flask equipped with stirrer, reflux cooler, dropping funnel and immersion thermometer, a solution of 64.5 g. (0.46 mol.) of boron trifluoride-tetrahydrofuran in 100 ml. of tetrahydrofuran is added dropwise in about 30 minutes to a suspension of 15.1 g. (0.4 mol.) of sodium borohydride in a solution of 92 g. (0.46 mol.) of 4-cyano-2:2:6:6-tetramethyl-2:6-disila-tetrahydropyran in 350 ml. of dry tetrahydrofuran. The reaction mixture is then heated for about 1 hour under reflux, left to cool and filtered and the filtration residue is washed out with tetrahydrofuran and the THF is removed from the filtrate by distillation. The distillation residue is taken up in benzene and filtered, the benzene is removed by distillation and the crude, waxy B:B′:B″-trihydro-N:N′:N″ - tris(2:2:6:6 - tetramethyl-2:6-disila-tetrahydropyranyl-(4)-methyl)-borazole is recrystallized from benzene/hexane. Yield: 95 g., i.e. practically quantitative. The borazole identified by the IR-spectrum and the nuclear resonance spectrum has a melting point of 122 to 124° C.

*Analysis.*—Theoretical: 5.1% B, 6.6% N, 26.3% Si. Found: 5.2% B, 6.6% N, 25.7±0.5% Si.

EXAMPLE 2

Preparation of B:B′:B″-trihydrido-N:N′:N″-tris-[δ-hydrido-dimethyl-silyl-butyl]-borazole.

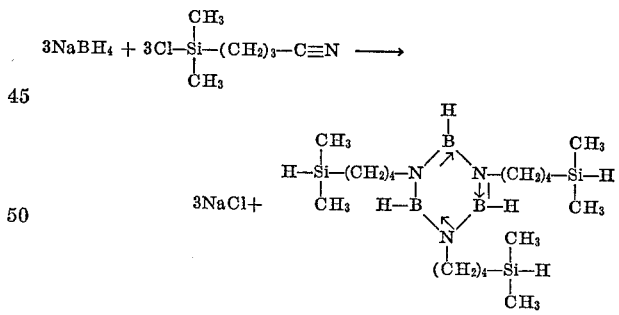

In the apparatus described in Example 1 162 g. (1 mol.) of γ-cyano-propyl dimethyl chloro silane is added dropwise within about 2 hours under anhydrous conditions to a suspension of 41.8 g. (1.1 mols.) of sodium borohydride in 300 ml. of dry tetrahydrofuran. The content of the flask is then heated under reflux for about 4 hours, then allowed to cool. The resulting sodium chloride and excess borohydride is separated by filtering, the filtration residue is washed out with dry tetrahydrofuran and the tetrahydrofuran is removed from the filtrate by distillation. The distillation residue is liberated from all volatile constituents in the vacuum of an oil pump at a temperature of 80° C. 135 g. (corresponding to a yield of 95% of the theoretical) of B:B′:B″-trihydrido-N:N′:N″-tris-[δ-hydrido-dimethylsilyl-butyl]-borazole are obtained as a colorless viscous oil which is identified by the IR-spectrum.

*Analysis.*—Theoretical: 7.7% B, 9.9% N. Found: 7.5% B, 9.65% N.

EXAMPLE 3

Preparation of B:B′:B″-trihydrido-N:N′:N″-tris-[γ-dihydrido-methyl-silyl-propyl]-borazole.

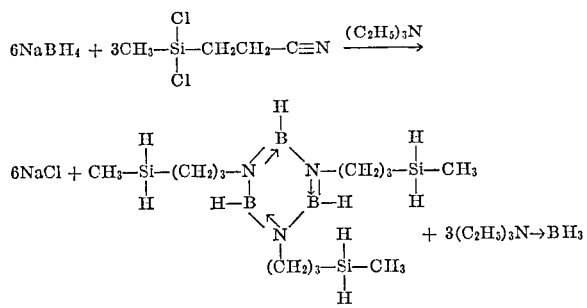

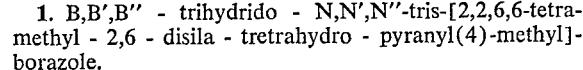

168 g. (1 mol.) of p-cyano-ethyl methyl dichlorosilane are added dropwise under the conditions according to the preceding examples to a suspension of 83.6 g. (2.2 mols.) of sodium borohydride in 700 ml. of dry tetrahydrofuran under anyhydrous conditions and with stirring within about 2.5 hours. The reaction mixture is then heated under moderate reflux for about 4 hours. The mixture is then left to cool, 101 g. (1 mol.) of dry triethylamine are added dropwise to the reaction mixture which is stirred for about another 10 minutes, filtered, the filtration residue is thoroughly washed out with dry tetrahydrofuran and the tetrahydrofuran is distilled from the filtrate at atmospheric pressure. The resulting triethylamine borane (N-triethyl borazane) (B.P. 95–98° C. 10 mm. Hg; yield 93 g.=81% of the theoretical) is separated from the residue by distillation at a pressure of 10 mm. Hg. After heating the residue at 80° C. in the vacuum of an oil pump 105 g. (corresponding to a yield of 93% of the theoretical) of B:B′:B″-trihydrido-N:N′:N″-tris-[γ-dihydrido-methyl-silyl-propyl]-borazole are obtained in form of a slightly yellow colored viscous oil which is identified by the IR-spectrum.

*Analysis.*—Theoretical: 9.6% B, 12.4% N. Found: 9.8% B, 12.1% N.

We claim:
1. B,B′,B″ - trihydrido - N,N′,N″-tris-[2,2,6,6-tetramethyl - 2,6 - disila - tretrahydro - pyranyl(4)-methyl]-borazole.

References Cited

UNITED STATES PATENTS 3,255,245    6/1966    Horn et al. _____ 260—551

OTHER REFERENCES

Brown et al., J. Am. Chem. Soc., vol. 80, pp. 1552–56 (1958).

Evers et al., J. Am. Chem. Soc. (1959), vol. 81, pp. 4493–96.

Cotton et al., Advanced Inorganic Chemistry: A Comprehensive Text (1962), John Wiley and Sons, p. 190.

JOHN D. RANDOLPH, *Primary Examiner.*

WALTER A. MODANCE, *Examiner.*

H. I. MOATZ, *Assistant Examiner.*